United States Patent [19]

Hayes

[11] 4,092,532
[45] May 30, 1978

[54] BINARY APPARATUS FOR MOTION CONTROL

[75] Inventor: Patrick Dewey Hayes, San Diego, Calif.

[73] Assignee: The United Sates of America as represented by the Secretary of the Navy, Washington, D.C.

[21] Appl. No.: 740,514

[22] Filed: Nov. 10, 1976

[51] Int. Cl.² .......................................... H01J 39/12
[52] U.S. Cl. .................................... 250/221; 250/229
[58] Field of Search ........................ 250/222, 221, 229

[56] References Cited

U.S. PATENT DOCUMENTS

| | | | |
|---|---|---|---|
| 3,016,421 | 1/1962 | Harmon | 250/222 |
| 3,478,220 | 11/1969 | Milroy | 250/221 |
| 3,549,896 | 12/1970 | Masino et al. | 250/222 X |
| 3,764,813 | 10/1973 | Clement et al. | 250/221 |

*Primary Examiner*—Palmer C. Demeo

*Attorney, Agent, or Firm*—R. S. Sciascia; G. J. Rubens; H. Fendelman

[57] ABSTRACT

Radiant energy sensors situated in first and second orthogonally positioned arrays may be activated by radiant energy projected thereupon by radiant energy sources spatially separated therefrom, each of the sensors providing a first output level when activated and otherwise providing a second level of output. A control element subject to an operator's manipulation is situated between the sensors of both arrays and their respective activating sources, and is disposed to be movable in two spatial dimensions to selectively shadow sensors of both arrays. The combined outputs of the sensors of the first and second array comprise a control signal in digital form, wherein discrete positions of the control element are represented, the digital control signal being coupled through a digital-to-analog converter to generate analog signals determinative of the motion of a light element on the screen of a cathode ray tube (CRT) display device and functionally related to control element position.

13 Claims, 5 Drawing Figures

BINARY APPARATUS FOR MOTION CONTROL

BACKGROUND OF THE INVENTION

The invention disclosed and claimed herein relates generally to a means for converting two-dimensional mechanical motion into control signals in digital form, and relates more specifically to a cursor control for use in conjunction with a cathode ray tube (CRT) display device.

Various cursor controls or cursor manipulators have previously been developed to enable the operator of a CRT display console to control the motion of a movable light element in two spatial dimensions on a planar CRT screen, and particularly to control the direction and rate of motion, or speed, of the element with respect to horizontal and vertical axes. Two of the more recent of such devices include the track ball and the finger sweep cursor controls.

In the track ball cursor control a rotatable spherical control element is juxtaposed in cooperative relationship with certain electrical apparatus such as a series of potentiometers. Rotation of the spherical element about a reference axis incrementally changes horizontal displacement of a movable light element on a CRT, and rotation about another reference axis, orthogonal to the first, incrementally changes vertical displacement. However, the incremental displacements provided by even an entire rotation of a spherical element about either reference axis may be so slight that an operator is required to make numerous rotations to realize a desired adjustment of light element motion. Operator efficiency may thereby be significantly reduced. In addition, track balls are expensive and structurally complex, and may be readily affected by environmental conditions.

In the finger sweep cursor control, light sensing devices, or sensors, are situated in two orthogonally positioned rows within an enclosure, each light sensor receiving a beam of light from a spatially separated light source and being activated thereby to produce an output voltage. To control horizontal motion of a movable light element on a CRT screen, an operator moves or sweeps his finger along one of the sensor rows, sequentially interrupting the beams to the sensors and temporarily deactivating them. Horizontal control circuitry coupled to the outputs of the sensors responds to the sequential deactivations by incrementally displacing the light element in relation to the horizontal axis of the CRT. To incrementally displace the light element in relation to the vertical axis, the operator moves or sweeps his finger along the other sensor row, the outputs of which are similarly coupled to vertical control circuitry. The rate of motion of the light element with respect to either CRT axis is determined by the rapidity of the movement of the operator's finger along the corresponding sensor row. As with the track ball, numerous movements of an operator's hand or finger may be required to effect a single change in light element motion, reducing operator efficiency and resulting in operator fatigue. Additionally, certain persons may be unable to operate a finger sweep control due to insufficient finger dexterity or other structural limitation of their hands or fingers.

SUMMARY OF THE INVENTION

The present invention provides a control apparatus wherein a control element disposed to be movable in two spatial dimensions may be discretely positioned by a control operator to generate motion control signals functionally related thereto. The apparatus may be usefully employed to control the direction and rate of motion of a movable light element on a CRT screen, although embodiments of the invention disclosed herein may also be employed to efficiently or conveniently direct two-dimensional motions of other movable objects or elements, such as a motorized wheelchair or a radio controlled model airplane.

The control element is movably situated between a first array of radiant energy sensing means, or sensors, and one or more sources of radiant energy, and also between a second array of radiant energy sensors and one or more sources of radiant energy. Each of the sources projects a beam of radiant energy towards one or more of the sensors, and each sensor is activated by the projection thereupon of one of such beams to provide a first level of sensor output. The control element, which is impervious to the energy beams may be discretely positioned in relation to both arrays to shadow or mask any sensor, whereby the sensor is deactivated to provide a second level of sensor output. Preferably, the sensors of the first array are spaced at discrete intervals along one of the aforesaid dimensions of control element movement and the sensors of the second array are likewise spaced along the other dimension. Since each sensor may have one of only two levels of output, each sensor output defines a binary bit of one of two logic levels. The position of the control element in its first dimension of movement may thereby be represented in digital form by a first binary word comprising the combined outputs of the sensors of the first array, and the position thereof in its second dimension of movement may be similarly represented by a second binary word comprising the combined outputs of the sensors of the second array. The position, or two-dimensional displacement, of the control element, measured from any arbitrary reference indices, may therefore be uniquely represented in digital form by a binary control signal comprising the first and second binary words. The invention further provides a control signal converter which receives the binary control signal and responds thereto by providing motion control signals functionally related therewith which are determinative of the motion of the movable object or element.

In a useful embodiment of the invention, position of the control element may be specified by the linear displacement thereof from an arbitrarily situated reference point, and by the angular displacement thereof from a reference line passing through the reference point, the linear and angular displacements being thereby represented in digital form in the binary control signal. The control signal converter receiving the binary signal is suitably designed to respond thereto to provide the movable object or element with a rate of motion which is directly proportional to the linear displacement of the control element, and an angular displacement which is equal to the angular displacement of the control element. The rate of motion and angular displacement of the movable object or element are in relation to a reference point and reference line respectively, which are visible to the operator. By providing such close relationship between the physical positioning of the control element and the motion of the controlled object or element, operator's eye to hand coordination may be enhanced to a high degree.

OBJECTS OF THE INVENTION

It is an object of the present invention to provide a new and improved apparatus for controlling the motion of a movable object or element in two spatial dimensions.

It is another object of the invention to provide a new and improved apparatus for controlling the motion of an object or element in two spatial dimensions by slight linear or other simple movements of an operator's hand.

It is another object of the present invention to provide a new and improved apparatus for converting simple mechanical movement directly into binary control information.

It is another object of the present invention to provide a more efficient and responsive cursory control for a CRT display device.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
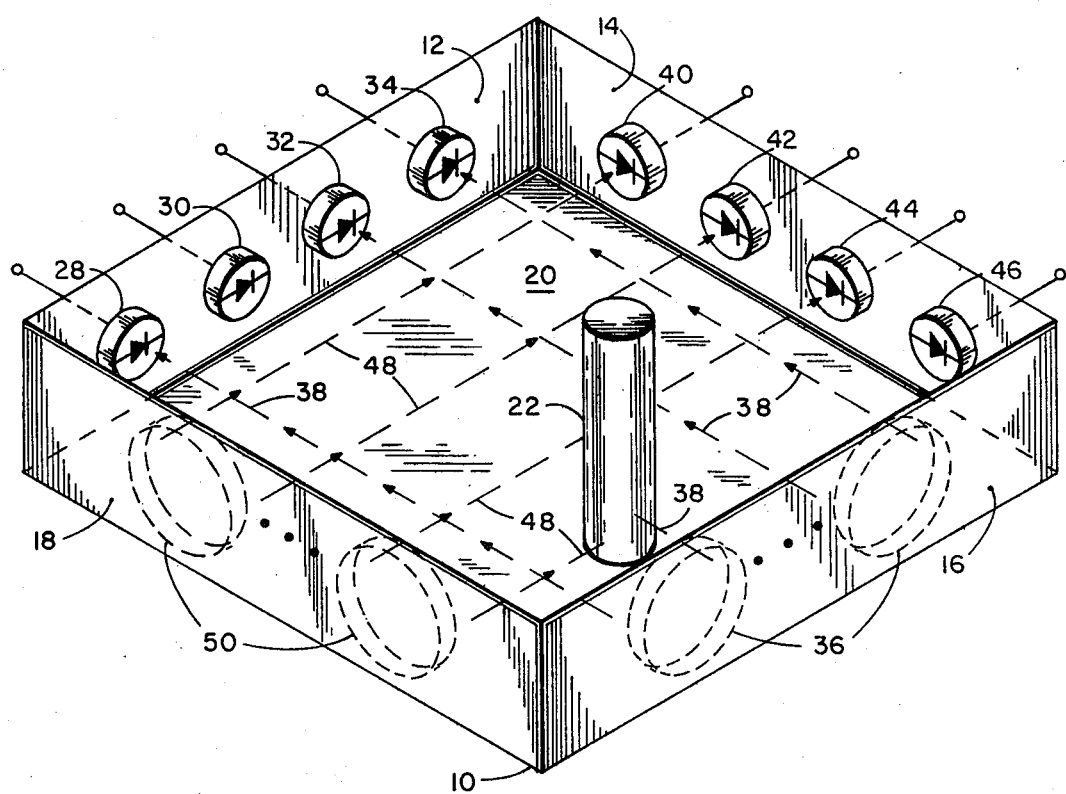
FIG. 1 is a schematic diagram showing an operator control means which may be used in an embodiment of the invention.

Referring to FIG. 1, there is shown an operator control means comprising a rectangular enclosure 10 and other components associated therewith. Enclosure 10 comprises side members 12, 14, 16, and 18, and bottom member 20, each of the members being of rectangular shape and joined to other members in orthogonal relationship along adjacent edges. An elongated control element 22 has a lower portion projecting into enclosure 10 and an upper portion projecting upward therefrom to enable manipulation of control element 22 by a control operator. Control element 22 is constrained by any suitable means (not shown in FIG. 1) to be movably positionable, or displaced in two spatial dimensions, within enclosure 10, a first dimension being parallel to side members 12 and 16 and a second dimension being parallel to side members 14 and 18.

Radiant energy sensors 28-34, which may usefully comprise standard photoconductive cells, are situated in a first array in parallel alignment at discrete intervals along the inner surface of side member 12. Each sensor is activated whenever sufficient radiant energy impinges thereupon to provide a first level of output voltage at its output terminal, and is otherwise deactivated to provide a second level of output voltage. Radiant energy sources 36, which may comprise a selected number of light emitting diodes, are situated on the inner surface of side member 16 and are oriented with respect to sensors 28-34 to project thereupon activating light or other radiant energy beams 38. The beams 38 are generally linear and traverse a plane parallel to bottom member 20 of enclosure 10 in generally parallel spaced relationship. The lower portion of control element 22 is formed of an opaque material impervious to light or other radiant energy, and the dimensions thereof are large in comparison with the cross-sectional areas of beams 38 and small in comparison with the intervals therebetween. The lower portion of control element 22 is movably positionable between sensors 28-34 and energy sources 36, whereby any sensor of the first array may be shadowed or masked, and hence deactivated, by selectively positioning control element 22 in its first dimension of movement. Each first level output of a sensor 28-34 defines a binary bit of logic level 1, and each second level output defines a logic level 0, the combined outputs of the sensors of the first array comprising a first binary word which represents positions of control element 22 in its first dimension of movement. In other embodiments of the invention the complementary convention for defining logic 1's and logic 0's may be used.

In a like manner, sensors 40-46 are situated in a second array along the inner surface of side member 14 at discrete intervals to provide first levels of output voltage when activated and second levels of output voltage when deactivated, whereby the outputs of the second array comprise a second binary word. Sensors 40-46 may be activated by radiant energy beams 48 projected thereupon by a selected number of radiant energy sources 50 situated on the inner surface of side member 18, beams 48 being generally linear and traversing the same plane traversed by energy beams 38, in a direction generally orthogonal thereto, in spaced parallel relationship. The lower portion of control element 22 is movably positionable between sensors 40-46 and energy sources 50, and its dimensions are large in comparison with the cross-sectional areas of beams 48 and small in comparison with the intervals therebetween, in like manner with beams 38. Control element 22 may be selectively positioned in its second dimension of movement to deactivate any sensor 40-46, whereby positions of control element 22 in its second dimension of movement are represented in the second binary word.

The first and second binary words together comprise an eight-bit binary control signal, wherein analog coordinates describing the position, or two-dimensional displacement, of control of element 22 within enclosure 10 are represented or encoded. The binary control signal provided by the operator control means shown in FIG. 1 may provide up to 25 discrete states from which motion control signals may be recovered or decoded.

Figure 2:
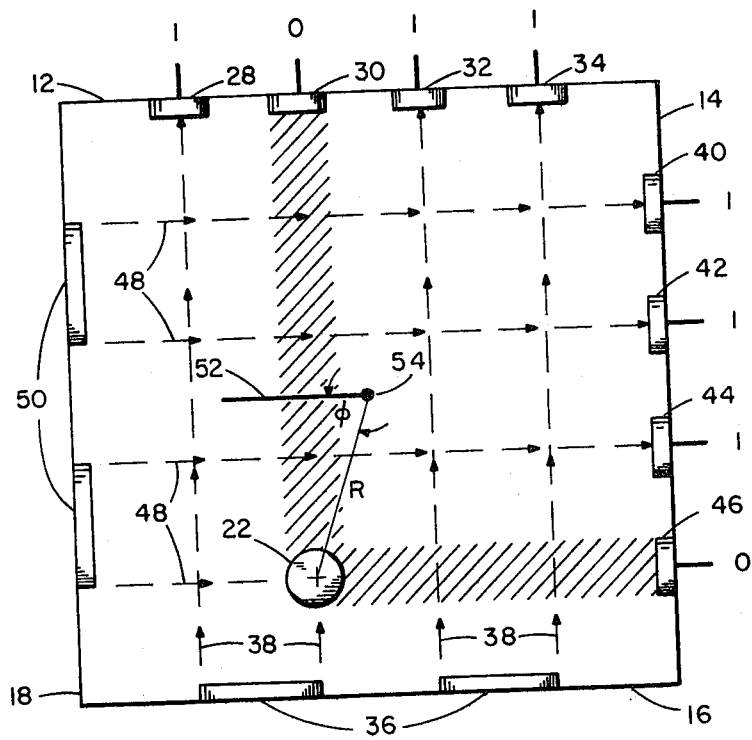
FIG. 2 shows a plan view of the operator control means of FIG. 1 with reference indices superimposed thereon to illustrate a manner of referencing the position of the control element of an operator control means.

Referring to FIG. 2, there is shown a reference axis 52 lying in the plane traversed by energy beams 38 and 48 and having a reference point 54 thereon, the two-dimensional position of control element 22 being described in relation thereto by polar coordinates R, $\phi$. R is the linear displacement from point 54 to a point defined by the intersection of control element 22 and the traversed plane, and $\phi$ is the angular displacement from axis 52 to the line along which R is measured. FIG. 2 further shows control element 22 positioned to shadow sensor 30 of the first array to generate a binary word 1011 and sensor 46 of the second array to generate a second binary word 1110. The analog quantities R, $\phi$ which specify the position of control element 22 are thereby represented by digital information comprising the binary words 1011 and 1110.

Figure 3:
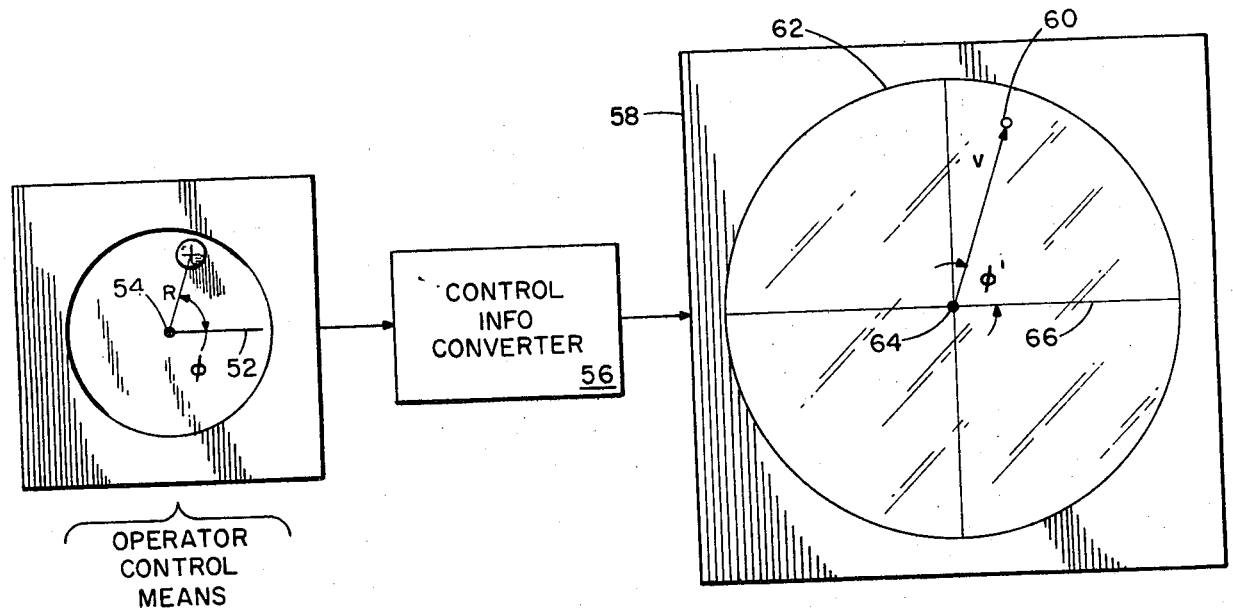
FIG. 3 shows a block diagram of an embodiment of the invention coupled to a CRT display device.

Referring to FIG. 3, there is shown an operator control means coupled to a control signal converter 56, which in turn provides motion control signals in analog form to CRT display device 58. The motion control signals are determinative of the rate of motion v of movable light element 60 on CRT screen 62 with respect to reference point 64, and of the direction of motion $\phi^1$ of element 60 with respect to horizontal axis 66. Converter 56, in response to a binary control signal representing discrete values of R and $\phi$ provides a plurality of motion control signals, whereby v is directly proportional to R, and $\phi = \phi^1$. Control signal converter 56 comprises a digital-to-analog converter, and may be configured in various ways which will be readily apparent to persons skilled in the art. In other embodiments of the invention, converter 56 may comprise a digital-to-digital converter if motion control signals are required to be in digital form.

Figure 4:
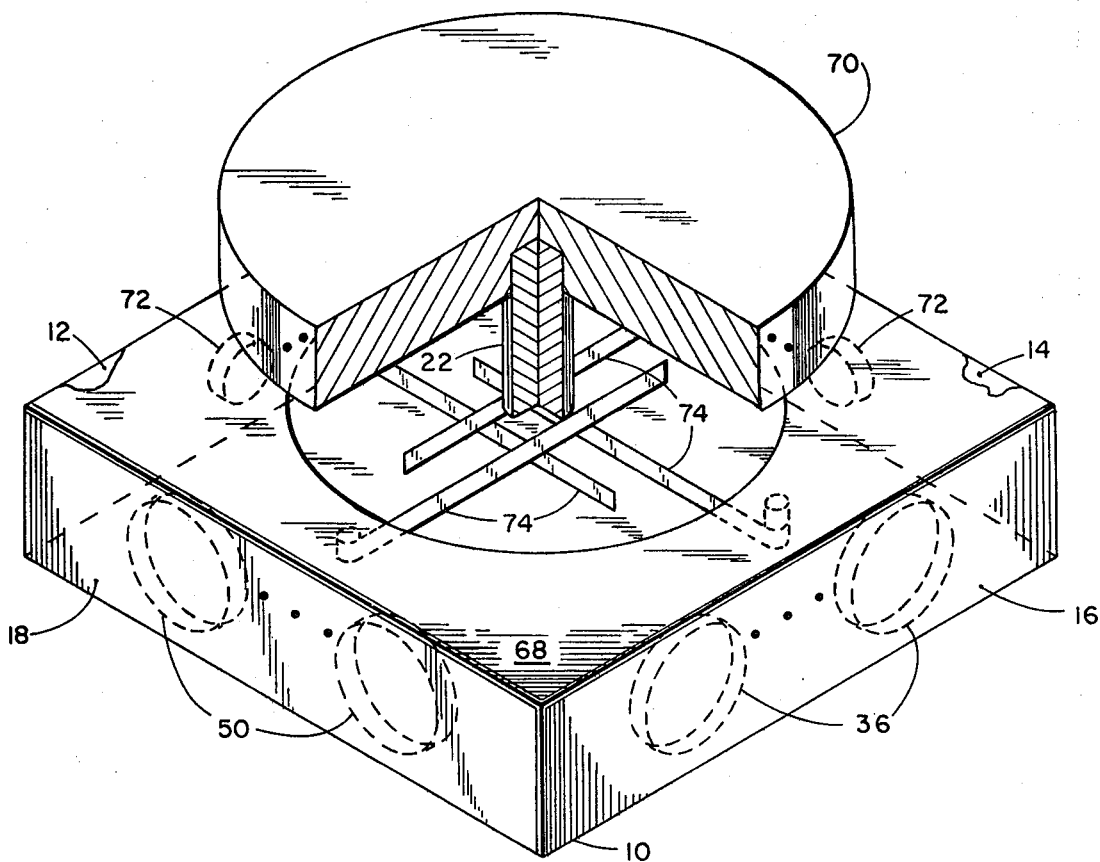
FIG. 4 is a schematic diagram showing a modified operator control means in which a control element and push plate have been exploded from the rest of the figure and a cross section removed therefrom for purposes of illustration.

Referring to FIG. 4, there is shown enclosure 10 having a rectangular top member 68 which is joined to side members 12–18 along adjacent edges and which is provided with a circular aperture and a generally planar upper surface. Push plate 70, which is a circular disk having a diameter in excess of the aperture diameter, has a generally planar under surface maintained in slidable contact with the upper surface of top member 68 to enable a control operator to readily manipulate push plate 70 with respect to the aperture. Control element 22 is affixed to push plate 70 and is suspended downward therefrom to selectively shadow or mask radiant energy sensors 72, which are situated in first and second arrays of n sensors, in the manner hereinbefore described. By increasing the number of sensors 72 in either array the output binary control signal may be increased in length and the sensitivity or fineness of control improved.

Figure 5:
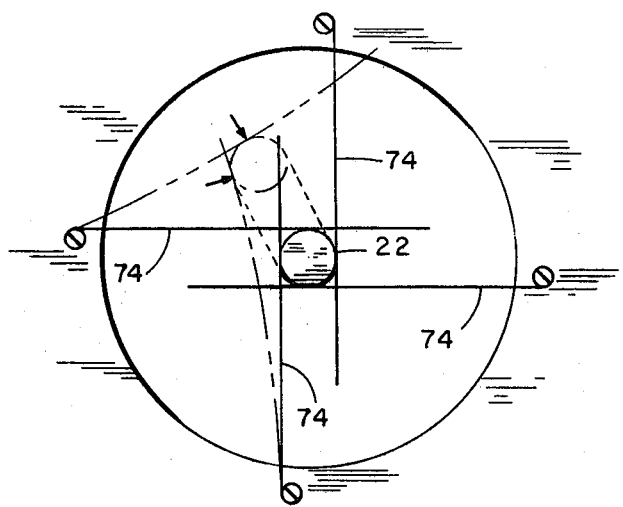
FIG. 5 is a diagram illustrating the operation of the restraining springs of FIG. 4.

Referring further to FIG. 4 and also to FIG. 5, there are shown restraining springs 74 of any suitable type attached to the under surface of top member 68 and arranged in relation to control element 22 to cooperatively resist any movement of control element 22 away from a fixed position. If the linear displacement of control element 22 is zero whenever control element 22 is situated at the fixed position, an operator controlling a movable element may stop the movable element by simply releasing push plate 70, whereupon control element 22 is quickly returned to the fixed position.

Obviously many modifications and variations of the present invention are possible in the light of the above teachings. It is therefore to be understood that within the scope of the appended claims the invention may be practiced otherwise than as specifically described.

What is claimed is:

1. An apparatus for directing the motion of a movable element, said apparatus comprising:
   a. first and second arrays of radiant energy sensing means, each of said sensing means providing an output which defines a binary bit of a first logic level when activated, and which defines a binary bit of a second logic level when deactivated;
   b. a selected number of radiant energy sources spatially separated from said first and second arrays for projecting activating radiant energy towards the sensing means of said first and second arrays;
   c. a control element which is spatially positionable in relation to the sensing means of said first and second arrays to provide a binary control signal, discrete spatial positions of said control element being represented therein, said control element comprising first means for engagement by an operator to selectively position said control element in said relation to said sensing means of said first and second arrays and second means for urging said control element to a predetermined rest position; and
   d. a control signal conversion means coupled to receive said binary control signal and responsive thereto for generating a selected number of motion control signals determinative of the motion of said movable element.

2. The apparatus of claim 1 wherein selected sensing means in said first and second arrays may be deactivated by discretely positioning said control element.

3. The apparatus of claim 2 wherein said control element may be positioned between selected sensing means of said first array and selected radiant energy sources, and may likewise be positioned between selected sensing means of said second array and selected radiant energy sources.

4. The apparatus of claim 3 wherein said control element is movable in a first spatial dimension, the sensing means of said first array being situated along said first dimension, and also in a second spatial dimension, the sensing means of said second array being situated along said second dimension.

5. The apparatus of claim 4 wherein a discrete position of said control element is specified by the linear displacement thereof from a first reference point, and by the angular displacement thereof from a first reference line passing through said first reference point.

6. The apparatus of claim 5 wherein the motion control signals generated by said control signal conversion means comprise a first signal directing the rate of motion of said movable element in relation to a second reference point, and a second signal directing the angular displacement of said movable element in relation to a second reference line passing through said second reference point.

7. The apparatus of claim 6 wherein the rate of motion of said movable element is directly proportional to the linear displacement of said control element and the angular displacement of said movable element is equal to the angular displacement of said control element.

8. The apparatus of claim 7 wherein each of said radiant energy sensing means comprises a photoconductive cell and each of said radiant energy sources comprises a light emitting diode.

9. The apparatus of claim 8 wherein said control signal conversion means comprises a digital-to-analog converter.

10. The apparatus of claim 9 wherein said movable element comprises a movable light element on the screen of a cathode ray tube display device.

11. The apparatus of claim 1 wherein said control element further comprises a control member that is impervious to said radiant energy;
   said first means being operably coupled to said control member; and
   said second means operably engaging said control member.

12. The apparatus of claim 11 wherein said first means comprises a push plate.

13. The apparatus of claim 12 wherein said second means comprises spring means for permitting displacement of said control member upon said selective positioning by said operator and for continually urging said control member to said rest position.

* * * * *